United States Patent [19]

Machida

[11] Patent Number: 4,951,179
[45] Date of Patent: Aug. 21, 1990

[54] LIGHTING DEVICE FOR VEHICLE

[75] Inventor: Tsutomu Machida, Shizuoka, Japan

[73] Assignee: Koito Manufacturing Co., Ltd., Tokyo, Japan

[21] Appl. No.: 385,843

[22] Filed: Jul. 27, 1989

[30] Foreign Application Priority Data

Aug. 2, 1988 [JP] Japan ............................ 63-102021[U]

[51] Int. Cl.$^5$ .............................................. B60Q 1/00
[52] U.S. Cl. ....................................... 362/61; 362/800; 362/80; 362/245; 362/252; 362/332; 362/338
[58] Field of Search .................... 362/61, 80, 244, 246, 362/245, 252, 235, 326, 332, 268, 333, 374, 335, 336, 337, 338, 339, 340, 800, 83.3; 296/206

[56] References Cited

U.S. PATENT DOCUMENTS

| | | | |
|---|---|---|---|
| 4,591,954 | 5/1986 | Kawamura et al. | 362/61 |
| 4,654,629 | 3/1987 | Bezos et al. | 362/800 |
| 4,680,678 | 7/1987 | Iwaki et al. | 362/61 |
| 4,733,335 | 3/1988 | Serizawa et al. | 362/80 |
| 4,845,600 | 7/1989 | Matsumura et al. | 362/80 |

*Primary Examiner*—Ira S. Lazarus
*Assistant Examiner*—D. M. Cox
*Attorney, Agent, or Firm*—Sughrue, Mion, Zinn, Macpeak & Seas

[57] ABSTRACT

A lighting device such as a rear-spoiler stop lamp in which the percentage of utilization of the available light and the illuminating effect produced by the lamp are enhanced despite the convexity of the face lens of the lamp, and the entire face lens is uniformly irradiated with the light. The device includes a device body composed of a base and a face lens and includes a large number of juxtaposed light-emitting diodes. The face lens is convexly curved at a prescribed curvature. The inside surface of the face lens is formed with light control portions corresponding to respective ones of the light-emitting diodes arranged in such a manner that the rays of light emitted from the diodes are directed in prescribed directions by the light control portions. The intervals between the light-emitting diodes and the intervals between the respective light control portions are changed depending on the curvature of the face lens so that the intervals are a maximum at the center of the lens and gradually decrease toward both the two ends.

14 Claims, 10 Drawing Sheets

LIGHTING DEVICE FOR VEHICLE

BACKGROUND OF THE INVENTION

The present invention relates to a vehicular lighting device which employs a large number of light-emitting diodes as light sources.

Figure 1:
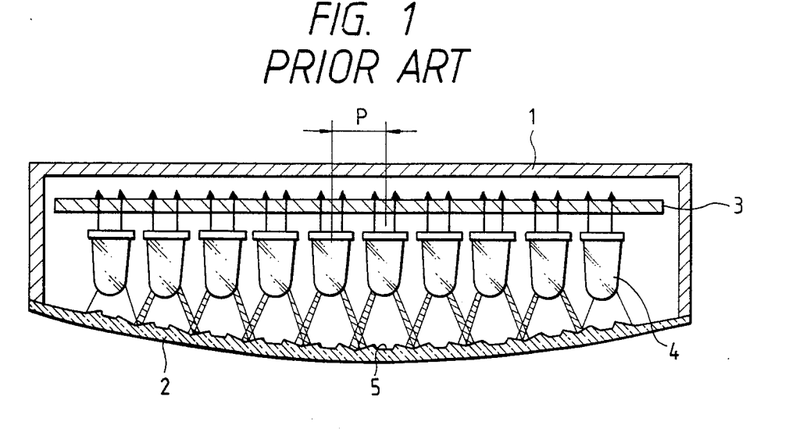
FIG. 1 is a horizontal sectional view of a conventional stop lamp.

A conventional high-mount stop lamp or the like, which is mounted high on the rear portion of the body of a motor vehicle and is lit during braking of the vehicle, includes a large number of light-emitting diodes as light sources as shown in FIG. 1. The stop lamp includes a base 1, a face lens 2 covering the interior opening of the base 1, a printed circuit board 3 disposed inside the base 1, light-emitting diodes 4 juxtaposed on the printed circuit board 3 at prescribed intervals P in the direction of the width of the body, and light control portions 5 formed on the inside surface of the face lens and corresponding in position to respective ones of the diodes, whereby the rays of light emitted from the diodes are directed in prescribed directions by the light control portions.

However, since the interval $P_0$ between the light control portions 5 of the conventional stop lamp is constant throughout the length of the stop lamp and the face lens 2 has a prescribed curvature, the distance L between each light-emitting diode 4 and the light control portion corresponding thereto differs along the length of the lamp with the distance being a maximum at the center of the lens and gradually decreasing toward the two ends thereof. For this reason, although the angles of diffusion $\alpha$ of the light from the diodes 4 are equal to each other, the areas of the lens 2 irradiated with the rays of light from the respective diodes differ from diode to diode. As a result, the light is not effectively used for illumination.

Figure 2:
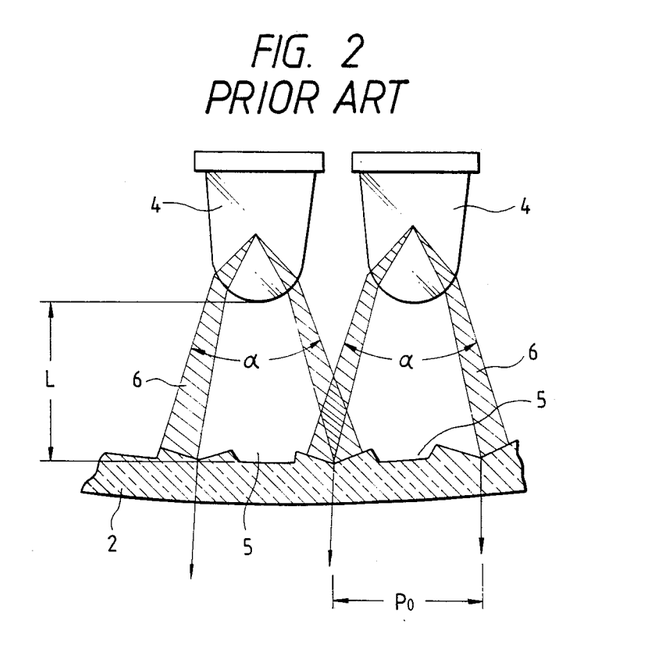
FIG. 2 is a enlarged sectional view of a major part of the face lens of the conventional stop lamp.

As shown in FIG. 2, since the irradiated area becomes larger as the distance L between the diodes 4 and corresponding light control portions 5 increases, some 6 of the light emitted from the diodes 4 irradiates the adjacent light control portions 5. If the distance L between the light-emitting diodes 4 at both ends of the stop lamp and the corresponding light control portions 5 diode is set at an optimal value chosen so as to prevent the light 6 from irradiating the adjacent light control sections, the distance between the light-emitting diode at the center of the stop lamp and the light control portion corresponding to that diode is large, and consequently a large portion of the light 6 from the center diode irradiates the adjacent light control portions.

Moreover, since each of the light control portions 5 must be designed so that just the rays of light from the corresponding diode 4 are directed in a designated direction, the light control portions cannot function effectively for the light 6 from the adjacent diodes. Therefore, the light from the diodes 4 is not effectively used for illumination.

On the other hand, if the distance L between the light-emitting diode 4 at the center of the stop lamp and the corresponding light control portion is set at a value so as to prevent the light from the diode irradiating the adjacent light control portions, the irradiated area of the face lens 2 decreases toward the ends of the stop lamp, and hence dark stripes are formed between the light control portions. In this case too the light from the light-emitting diodes is not effectively used. The problem becomes more serious as the curvature of the face lens 2 is increased.

SUMMARY OF THE INVENTION

The present invention was made in order to solve the above problems.

Accordingly, it is an object of the invention to provide a lighting device of simple construction in which the percentage of utilization of the available light and the illuminating effect produced by the lamp are enhanced despite the convexity of the face lens of the lamp, and the entire face lens is uniformly irradiated with the light.

A lighting device provided in accordance with the present invention includes a device body composed of a base and a face lens and includes a large number of juxtaposed light-emitting diodes. The face lens is convexly curved at a prescribed curvature. The inside surface of the face lens is formed with light control portions corresponding to respective ones of the light-emitting diodes arranged in such a manner that the rays of light emitted from the diodes are directed in prescribed directions by the light control portions. The intervals between the light-emitting diodes and the intervals between the respective light control portions are changed depending on the curvature of the face lens so that the intervals are a maximum at the center of the lens and gradually decrease toward both the two ends.

Since the intervals between the light-emitting diodes of the lighting device provided in accordance with the present invention and the intervals between the light control portions of the device are changed depending on the curvature of the face lens so as to be maximum at the center of the lens and gradually decrease toward the two ends, the rays of light from the diodes do not overlap with each other and there are no gaps therebetween. For this reason, each light control portion is illuminated by its corresponding light-emitting diode in an efficient manner.

DESCRIPTION OF THE PREFERRED EMBODIMENTS

A preferred embodiment of the present invention will hereafter be described in detail with reference to the attached drawings.

Figure 3:
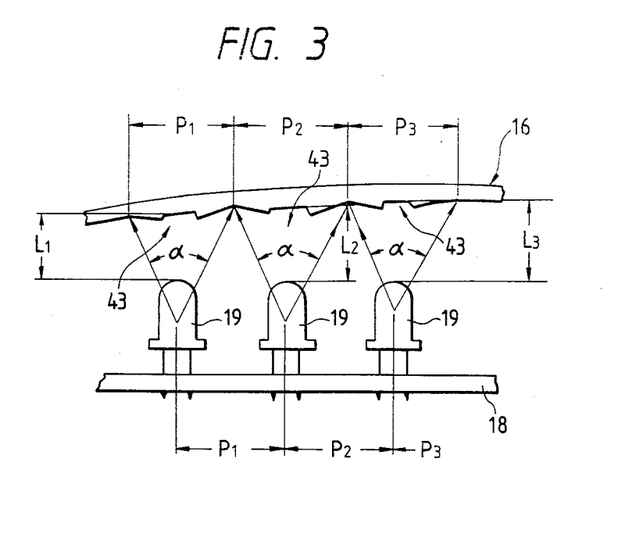
FIG. 3 is an enlarged sectional view of a major part of a stop lamp constructed in accordance with the present invention and which is disposed in the rear spoiler of a vehicle.

FIG. 3 is an enlarged sectional view of a major part of a stop lamp of a first preferred embodiment and which is provided in the rear spoiler of a vehicle. The construction of the rear spoiler and that of the stop lamp will be described with reference to FIGS. 4–11.

Figure 4:
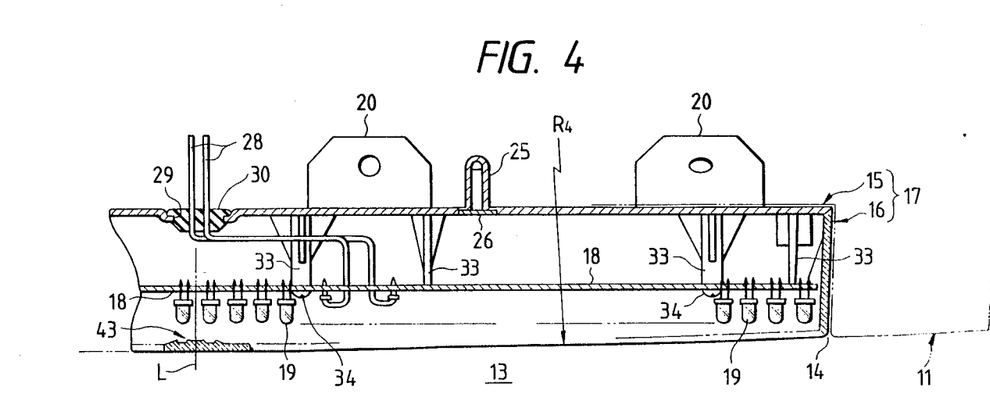
FIG. 4 is a sectional view of the stop lamp of FIG. 3 taken along a line C—C in FIG. 5.
Figure 5:
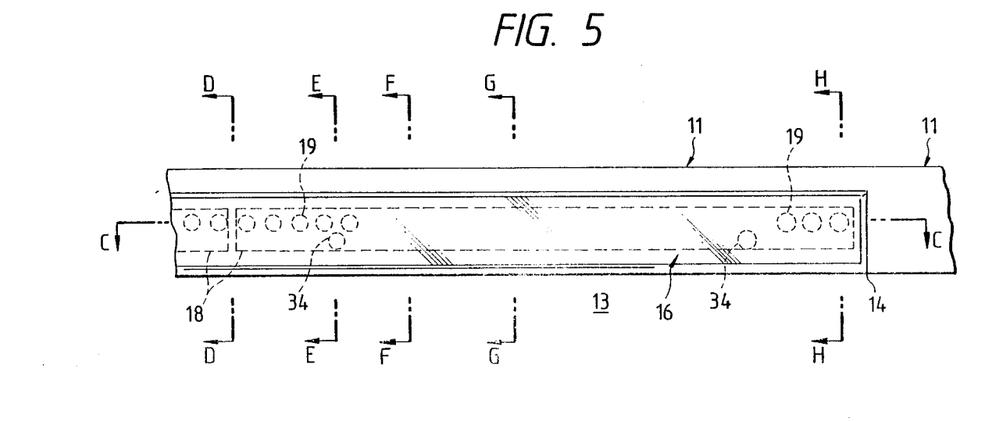
FIG. 5 is a front view of a major part of the stop lamp.
Figure 6:
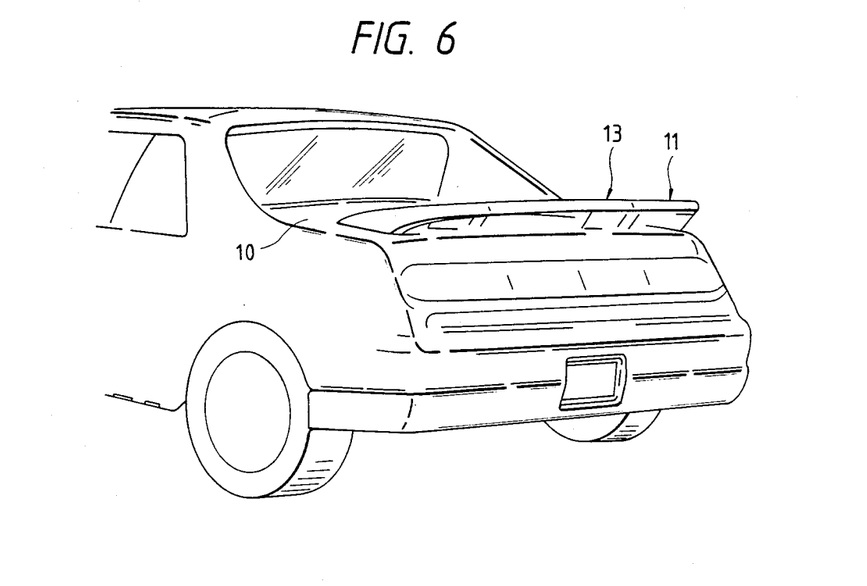
FIG. 6 is a perspective view of the rear portion of the vehicle.

The rear spoiler 11, which has a wing shape, is mounted with a gasket 12 on the top 10 of the rear portion of the body of the vehicle so that the spoiler extends rightward and leftward. The stop lamp 13, which has a belt-like shape, is disposed in a narrow notch 14 formed in the central lower portion of the body of the rear spoiler 11 extending rightward and leftward. The stop lamp 13 has a body 17 composed of a plate-shaped base 15 and a face lens 16, a printed circuit board 18 provided in the body, and a large number of light-emitting diodes 19 mounted on the board. The cross section of the face lens 16 is nearly U-shaped so that the lens is open at the rear side thereof. The lens 16 is secured at its rear edges to the front of the base 15 by ultrasonic welding or the like.

Figure 9:
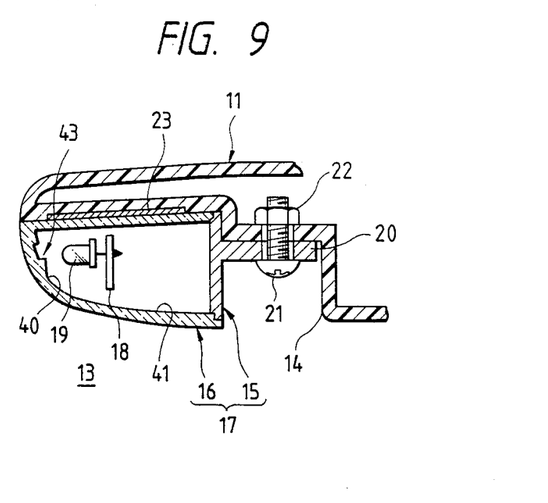
FIG. 9 is a sectional view of the stop lamp taken along a line F—F in FIG. 5.

As shown in FIGS. 4 and 9, a plurality of securing lugs 20 are formed on the rear of the base 15 integrally therewith so as to project forward with respect to the vehicle. The securing lugs 20 are firmly fixed to the rear spoiler 11 at the upper portion of the notch 14 by bolts 21 and nuts 22. The face lens 16 is secured at the top thereof to the rear spoiler 11 at the top of the notch 14 using a double-sided tape 23, a bolding agent, or the like.

Figure 10:
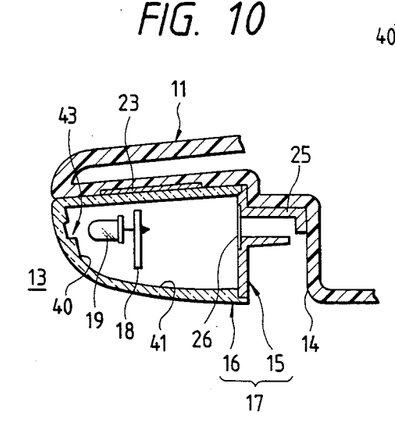
FIG. 10 is a sectional view of the stop lamp taken along a line G—G in FIG. 5.
Figure 11:
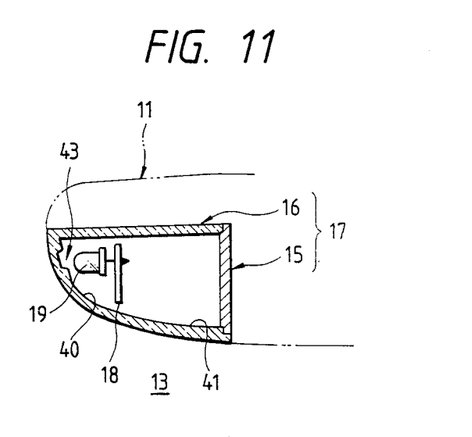
FIG. 11 is a sectional view of the stop lamp taken along a line H—H in FIG. 5.

As shown in FIGS. 4 and 10, a tube 25 is coupled to the appropriate portion of the rear of the base 15 so that the interior of the body 17 of the stop lamp 13 is communicated with the exterior thereof through the tube. The tube 25 is bent downward at its rear end so that rainwater or the like is prevented from entering the tube. Since the interior of the body 17 is communicated with the exterior thereof through the tube 25, air freely flows into and out of the body so that the temperature and humidity in the body are nearly equal to those on the outside. For this reason, the generation of dew, fluctuations in the temperature and pressure inside the body 17, and the like when the light-emitting diodes 19 are turned on and off are prevented or reduced.

As shown in FIGS. 4 and 10, a filter 26 is provided on the front end of the communication tube 25. The filter 26 is made of a porous film of fluorine resin, polyethylene, very high-molecular polyethylene, acrylic resin, or the like and is high in air penetrability, moisture penetrability and water resistance. Particularly, the filter 26 should be very high in air penetrability.

Figure 7:
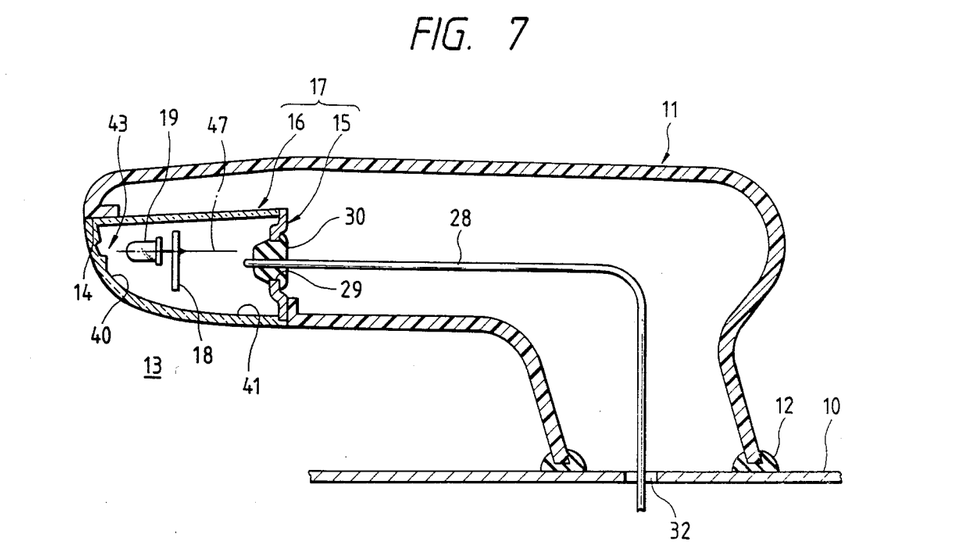
FIG. 7 is a sectional view of the stop lamp taken along a line D—D in FIG. 5.

As shown in FIGS. 4 and 7, in the central portion of the base 15 of the body 17 of the stop lamp 13 is formed a hole 29 through which lead wires 28 pass between the stop lamp and the rear spoiler 11. A rubber bushing 30 is fixedly fitted in the hole 29. The lead wires 28 are connected at one end thereof to the electric circuit of the printed circuit board 18, and extend into the body of the vehicle through the rear spoiler 11 and an insertion hole 32 at the top 10 of the rear portion of the vehicle body.

Figure 8:
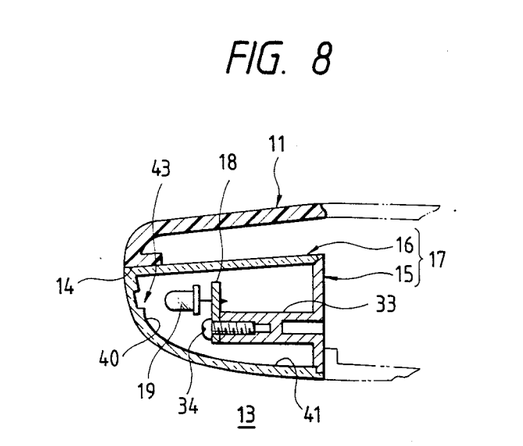
FIG. 8 is a sectional view of the stop lamp taken along a line E—E in FIG. 5.

As shown in FIGS 4 and 8, a plurality of printed circuit board mounting lugs 33 are formed on the front of the base 15 of the stop lamp 13 integrally therewith and extending rearward with regard to the vechicle. The printed circuit board 18 is secured to the tips of the lugs 33 in a nearly vertical position by screws 34. The light-emitting diodes 19 are juxtaposed in a horizontal row on the front of the printed circuit board 17 so that the axis 47 of each of the diodes is substantially horizontal, as shown in FIG. 7, and substantially parallel with the center line L of the vehicle body, as shown in FIG. 4.

Figure 12:
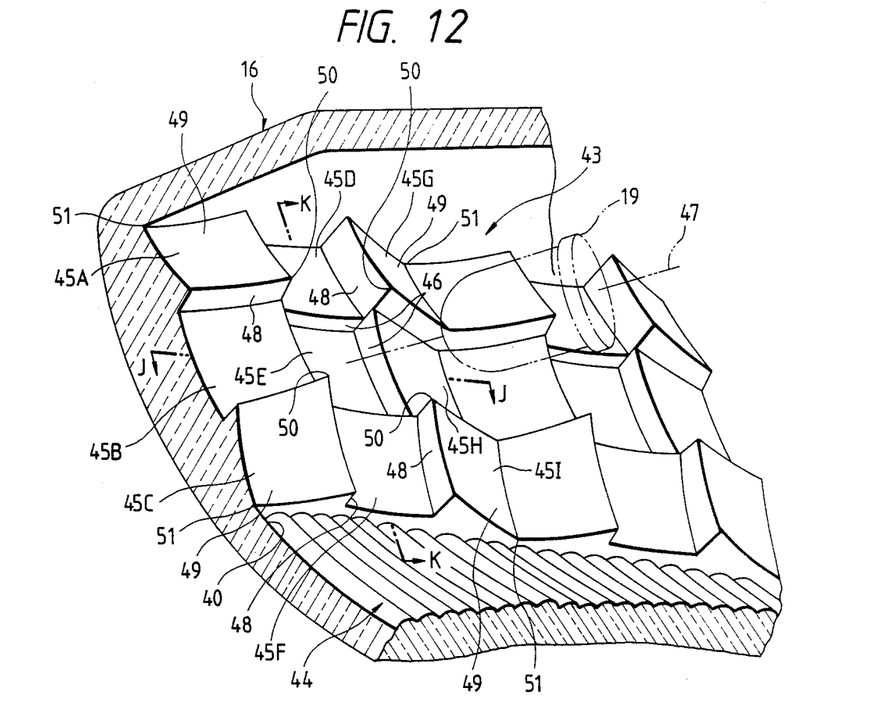
FIG. 12 is a perspective view of a light control portion of the stop lamp.

The face lens 16 is made of a translucent resin colored red, yellow or the like, and has a slender box-like shape extending rightward and leftward. The front surface of the lens 16 is convexly bent at a prescribed curvature $R_4$ so that the front surface is flush with the rear surface of the rear spoiler 11, as shown in FIGS. 3 and 4. The inside surface 40 of the front part of the face lens 16 is formed with a large number of light control portions 43 corresponding to respective ones of the light-emitting diodes 19, and is formed with a lower portion 44 extending under the light control portions along the total length of the face lens, as shown in FIG. 12. The light emitted from each light-emitting diode 19 is directed rearward with regard to the vehicle body by the light control portion 43 corresponding to the diode making it easy to see the lit stop lamp 13 from behind the vehicle body.

Figure 13:
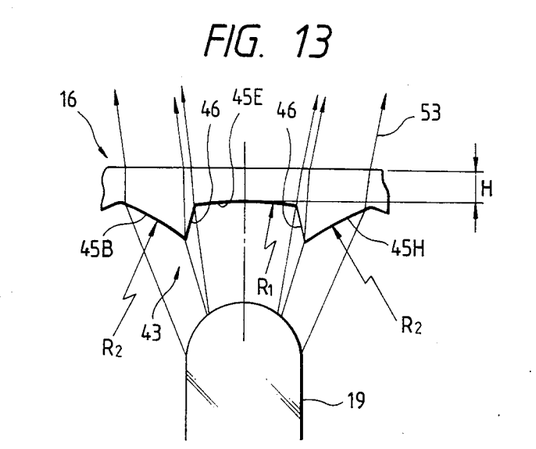
FIG. 13 is a sectional view of the stop lamp taken along a line J—J in FIG. 12.
Figure 14:
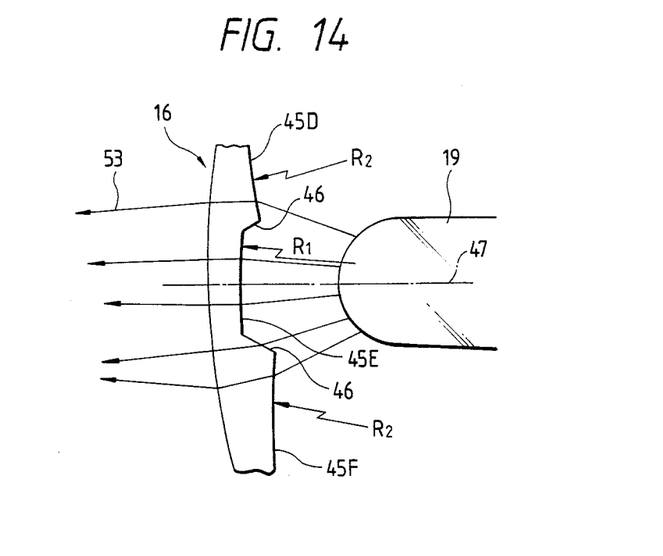
FIG. 14 is a sectional view of the stop lamp taken along a line K—K in FIG. 15.

As shown in FIGS. 12, 13 and 14, each light control portion 43 is composed of nine prisms 45A, 45B, 45C, 45D, 45E, 45F 45G, 45H and 45I, which all have substantially the same size. The prisms, which are squarely shaped on the tops thereof, are arranged in three rows so that the center line of the central prism 45E coincides with that of the light-emitting diode 19 corresponding to the light control portion. The top of the central prism 45E is concavely curved at an appropriate curvature $R_1$, as shown in FIGS. 13 and 14. The four prisms 45B, 45D, 45F and 45H located above, below, to the right and to the left of the central prism 45E project less far than the central prism at the sides 46 of the four prisms which are in contact with the central prism. The thickness of each of the four prisms 45B, 45D, 45F and 45H decreases from the side 46 thereof toward the opposite side thereof so that the horizontal sections of the two prisms 45B and 45H located to the right and left of the central prisms 45E are nearly triangularly shaped and symmetric to each other, as shown in FIG. 13. The vertical sections of the central prism are also substantially triangularly shaped, as shown in FIG. 14. The height of the side 46 of each of the two prisms 45B and 45H to the right and left of the central prism 45E is larger than that of the side 46 of the prism 45D located above the central prism but smaller than that of the side 46 of the prism 45F located below the central prism, as shown in FIG. 12. The tops of the four prisms 45B, 45D, 45F and 45H are concavely curved at an appropriate curvature $R_2$.

The other four prisms 45A, 45C, 45G and 45I located at the four corners of the light control portion 43 are larger in height than the former four prisms 45B, 45D, 45F and 45H and have projecting sides 48, as shown in FIG. 12. The tops 49 of the prisms 45A, 45C, 45G and 45I are concavely bent at an appropriate curvature so that the thickness of each of the prisms decreases from the corner 50 thereof at the central prism 45E toward the opposite corner 51 of the former. Therefore, the thickness of each of the prisms 45A, 45C, 45G and 45I is maximum at the inner corner 50 thereof and minimum at the outer corner 51 thereof. The horizontal and vertical sections of the prisms 45A, 45C, 45G and 45I are substantially triangularly shaped.

Indicated at H in FIG. 13 is the base thickness of the face lens 16. The prisms 45A, 45B, 45C, 45D, 45F, 45G and 45H and 45I have different heights of the projecting sides 46 and 48 thereof, different radii of curvature of the tops thereof, and so forth, so that light 53 emitted from the light-emitting diode 19 corresponding to the light control portion 43 is refracted toward the optical axis 47 of the diode by the prisms and transmitted rearward from the face lens 16 with regard to the vehicle.

Although the tops of the prisms 45A, 45B, 45C, 45D, 45E, 45F, 45G, 45H and 45I are concavely bent at appropriate curvatures in the above-described embodiment, the present invention is not limited to this arrangement and may be embodied in other ways. For example, the tops of all the prisms may be plane surfaces.

The lower portion 44 on the inside surface 40 of the face lens 16 along the lower edge thereof is composed of a large number of cylindrical lenses which are juxtaposed rightward and leftward, with each lens having a long axis extending forward and backward, as shown in FIG. 12, so that light emitted downward from the light-emitting diodes 19 is diffused rightward and leftward by the lower portion. For this reason, the light is prevented from being transmitted downward from the stop lamp 13 and conspicuously reflected rearward, with regard to the vehicle, by the top 10 of the rear portion of the body of the vehicle. The lower portion 44 may be omitted if desired.

Since the front of the face lens 16 is convexly curved, the distances $L_1$, $L_2$, $L_3$, ... from the light-emitting diodes 19 to the corresponding light control portions 43 are different from each other so that the distance is largest at the center of the lens and gradually decreases toward the two ends of the lens, as shown in FIG. 3. The intervals $P_1$, $P_2$, $P_3$, ... between the light-emitting diodes 19 and those $P_1$, $P_2$, $P_3$, ... between the light control portions 43 vary depending on the curvature of the front of the face lens 16 or on the distances $L_1$, $L_2$, $L_3$, from the diodes to the corresponding light control portions 43, with the intervals being largest at the center of the lens and gradually decreasing toward the ends thereof. That is, $P_1 < P_2 < P_3$ ... and $P_1 < P_2 < P_3$ ... . As a result, each light-emitting diode 19 illuminates the corresponding light control portion 43 within the light diffusion angle $\alpha$ of the diode along the total width of the portion in such a manner that the rays of light from adjacent diodes do not overlap each other, as occurs in the light control portions 5 of the conventional stop lamp shown in FIG. 1 and 2. For this reason, the whole face lens 16 is effectively illuminated at a nearly uniform luminance by the diodes 19, whereby the percentage of utilization of the light and the effect of the illumination are enhanced.

Although in the above example the stop lamp 13 is mounted in the rear spoiler 11, the present invention is not limited to this arrangement and may be used to advantage in various other types of lighting devices in which light-emitting diodes are provided as light sources, the outside surface of a face lens is convexly curved, and light control portions corresponding to the diodes are formed on the inside surface of the lens.

Figure 15:
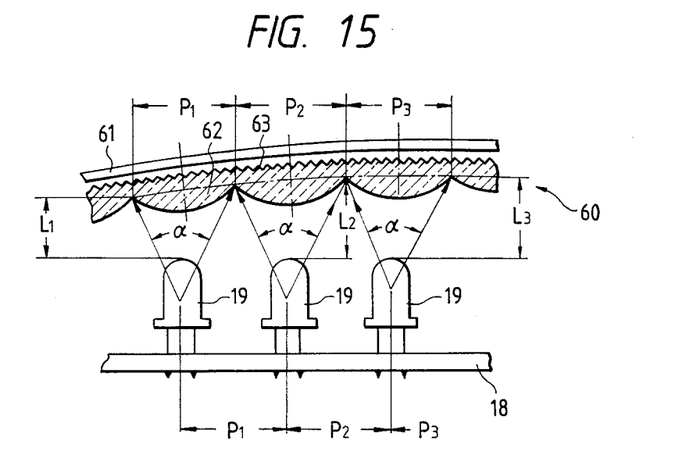
FIG. 15 is a view similar to FIG. 3 but showing a second embodiment of a stop lamp of the invention.
Figure 16:
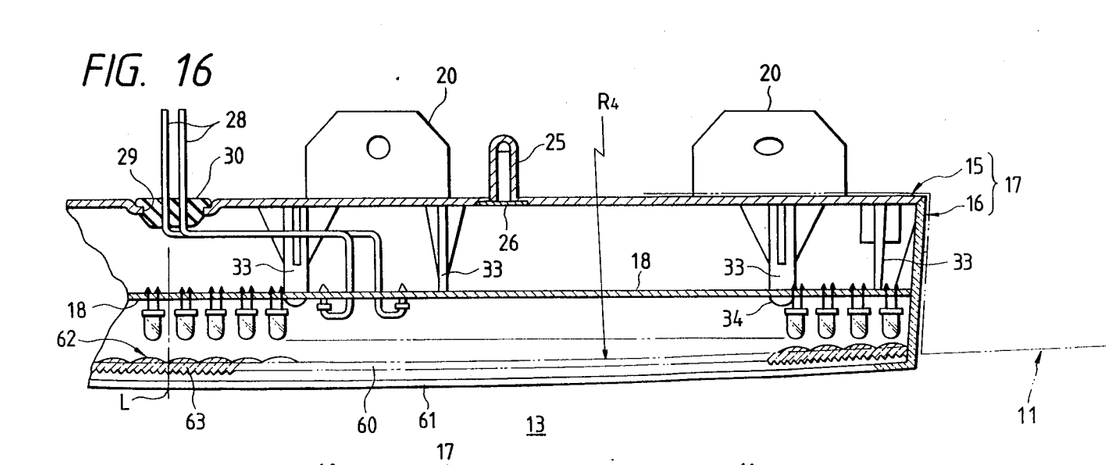
FIG. 16 is a view of the second embodiment similar to the view of FIG. 4.
Figure 17:
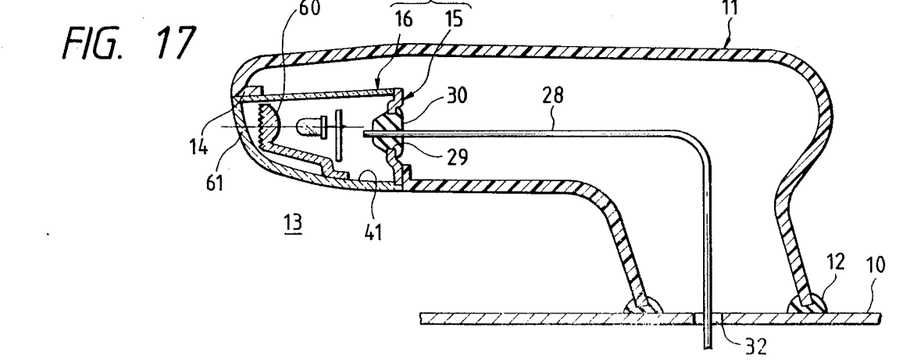
FIG. 17 is a view of the second embodiment similar to the view of FIG. 7.

Another embodiment of the invention is depicted in FIGS. 15, 16 and 17. In this embodiment, an inner lens 60 and an outer lens 61 are separately provided. The outer lens 61 is shaped similarly to the lens 2 in the above-described embodiment, but it has a smooth inner surface. That is, the outer lens 61 serves just as a cover lens. The light control portions in this second embodiment are defined by a single row of convex lenses 62 formed on the inner surface of the inner lens 60 with each lens 62 being disposed opposite a respective one of the light-emitting diodes 19. The outer surface of the inner lens 60 is formed with a matrix of smaller lenses 63. The lenses 62 and 63 are prismatic in shape, having a shape, for instance, as shown in FIG. 7 of commonly assigned U.S. Pat. No. 4,733,335. Thus, a so-called "fish-eye prism" is formed at both sides of the inner lens, with the size of the fish-eye prism being different on the two sides. With this arrangement, the light emitted by the light-emitting diodes 19 is condensed by the larger prisms on the inner side of the inner lens and then diffused by the smaller prisms on the outer side of the inner lens. Otherwise, the construction of the second embodiment is the same as that of the first embodiment.

In an automotive lighting device for a vehicle in accordance with the present device, the front of a face lens is convexly curved, light control portions are formed on the inside surface of the lens so as to correspond to respective ones of the light-emitting diodes, and the intervals between the diodes and the intervals between the light control portions are changed depending on the curvature of the face lens in such a manner that the intervals are largest at the center of the lens and decrease toward both the ends thereof. As a result, although the distances from the diodes to the light control portions corresponding thereto are different from each other, the rays of light emitted from the adjacent diodes do not overlap each other and have no gap therebetween. Accordingly, all the light-emitting diodes effectively illuminate the corresponding light control portions so that the whole front of the face lens is uniformly illuminated.

What is claimed is:

1. A lighting device for a vehicle, comprising: a lamp body comprising a base and a face lens, and a plurality of light-emitting diodes juxtaposed in said lamp body, said face lens being convexly curved at a predetermined curvature, an inside surface of said lens being formed with light control portions corresponding to said diodes so that the rays of light emitted from said diodes are directed in prescribed directions by said light control portions, and intervals between said diodes and intervals between said portions changing in a lengthwise direction along said face lens in an amount depending on said curvature so that said intervals are maximum at a center of said lens and gradually decrease toward both ends thereof.

2. The lighting device of claim 1, wherein said intervals are determined so that there is substantially no overlap of rays from adjacent diodes on entrance surfaces of respective ones of said light control portions.

3. The lighting device of claim 1, wherein said light-emitting diodes are arranged in a single row.

4. The lighting device of claim 1, wherein each of said light control portions comprises a plurality of prisms.

5. The lighting device of claim 4, wherein said prisms are nine in number and are arranged in three rows of three prisms each with a center line of a central one of said prisms aligned with an axis of a respective one of said light-emitting diodes.

6. The lighting device of claim 5, wherein said prisms all have substantially the same size and top shape.

7. The lighting device of claim 6, wherein a first four of said prisms located respectively above, below, to the right an to the left of said central prism project less from said face lens than said central prism, a thickness of each of said first four of said prisms decreases from a side thereof in contact with said central prism toward the opposite side thereof, heights of said side contacting said central prism of said prisms located to the right and left of said central prism are larger than heights of said side contacting said central prism of said prisms located above and below said central prism, and a second four of said prisms located at corners of said central prism have a greater height that said first four prisms at said corners of said central prism than at opposite corners thereof.

8. The lighting device of claim 7, wherein tops of each of said prisms are concavely curved.

9. The lighting device of claim 7, wherein tops of each of said prisms are planar.

10. The lighting device of claim 1, further comprising a lower portion formed in said face lens below said light control portions, said lower portion containing a large number of cylindrical lenses.

11. The lighting device of claim 1, wherein said face lens comprises an inner lens and an outer lens.

12. The lighting device of claim 11, wherein each of said light control portions comprises a convex lens formed on an inner surface of said inner lens.

13. The lighting device of claim 12, wherein a matrix of convex lenses is formed in an outer surface of said inner lens.

14. The lighting device of claim 1, further comprising means for mounting said lighting device in a high-mount rear spoiler of an automobile.

* * * * *